M. BELFRY.
WASTE PIPE TRAP PLUG.
APPLICATION FILED MAY 28, 1914.
1,151,653.
Patented Aug. 31, 1915.
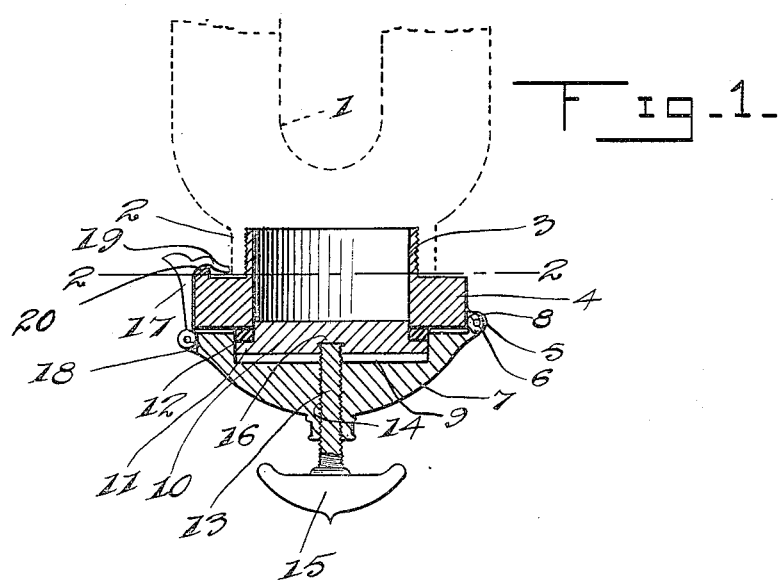
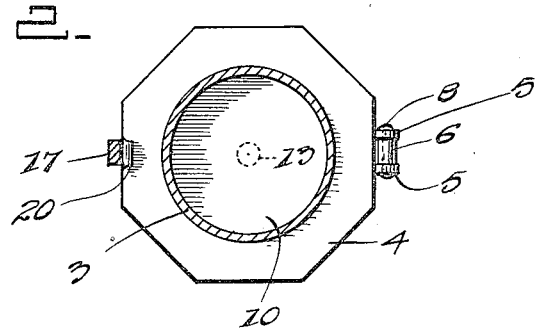
Witnesses
C. R. Beale
Wm. S. Fowler
Inventor
M. Belfry.
By [signature]
Attorney

UNITED STATES PATENT OFFICE.

MICHAEL BELFRY, OF CHICAGO, ILLINOIS.

WASTE-PIPE-TRAP PLUG.

1,151,653.

Specification of Letters Patent.

Patented Aug. 31, 1915.

Application filed May 28, 1914. Serial No. 841,513.

*To all whom it may concern:*

Be it known that I, MICHAEL BELFRY, a citizen of the United States, residing at Chicago, in the county of Cook and State of Illinois, have invented certain new and useful Improvements in Waste-Pipe-Trap Plugs, of which the following is a specification.

This invention comprehends certain new and useful improvements in waste pipe trap plugs and has for its primary object to provide a device of this character which may be readily secured upon the goose-neck portion of a waste pipe or removed from the same.

Another object is to provide a device of this character which will be of such construction that the trap may be readily drained without removing the cap, when desired.

A further object of the invention is to provide a trap plug of this character which will be constructed in such manner that the cap of the same may be readily locked in closed position or released, as desired.

This invention has for a further object to provide a trap of this character which will be constructed in such manner that the gasket may be forced into engagement with the end of the nozzle to form a water tight connection between the cap of the plug and the nozzle, and thereby prevent the contents of the trap from leaking out around the edge of the cap.

This invention has for a still further object to generally improve and simplify the construction and operation of devices of this character and increase the efficiency thereof without materially increasing the cost of the same.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a sectional view through my improved plug in locked position upon a conventional form of trap, and Fig. 2 is a detail sectional view on the plane of line 2—2 of Fig. 1.

Referring in detail to the drawings by numerals, 1 designates a trap of conventional form having a depending interiorly threaded flange 2 at its open lower portion within which is removably threaded a cleanout nozzle 3 having the enlarged flange 4 formed around its lower end and projecting beyond the flange 2 of the trap 1.

Projecting outwardly from one side of the flange 4 is a pair of perforated ears 5 between which is positioned an ear 6 projecting upwardly from the cap 7 of my improved trap plug engaged against the underface of said flange 4. A pin 8 is engaged through the ears 5 and 6 to rigidly connect the cap 7 with the flange 4 of the discharge nozzle of my plug. The cap 7 has a recess 9 formed in its upper face in which is positioned the plug 10 for engagement in the end of the discharge nozzle 3, said plug 10 having a flange 11 formed around its edge, upon which is positioned the gasket 12 for engagement against the outer end of said discharge nozzle 3 to form a water-tight joint and prevent the contents of said nozzle from escaping around the plug 10 when the device is in closed position, and the plug 10 is retained in operative position by means of the plug screw 13 which is threaded through the center of the cap 7, as shown at 14, and has a suitable head 15 formed upon its outer extremity by means of which said screw may be operated, it being understood that the inner end of the screw 13 is engaged centrally in the bottom of the plug 10, as shown at 16.

The cap 7 may be readily secured in closed position by means of the latch 17 which has its lower end pivoted to said cap 7 opposite the ears 5 and 6, as shown at 18, the free or working end 19 of said latch 17 being adapted for engagement over the latch lugs 20 formed on the upper face of the flange 4. It will be understood that after the latch member 17 has been engaged over the latch lugs 20, the screw 13 is moved inwardly to force the plug 10 into the discharge nozzle 3 and adjust the same within the end of said nozzle, and at the same time draw the cap 7 away from the flange 4 and tighten the latch member 17 upon the latch lug 20.

It will be readily understood that it will be impossible for the latch member 17 to be withdrawn from engagement with the latch lug 20 when the plug 13 is in its locked position and the gasket 12 is pressed against the end of the discharge nozzle 3 to prevent leakage.

It will be understood that this device may be readily secured in position or removed and should any of the parts become worn or broken, they may be readily replaced at a small cost.

While I have shown and described the preferred embodiment of my invention, it will be understood that minor changes in the details of construction, combination and arrangement of parts may be made without departing from the spirit and scope of the invention as claimed, or sacrificing any of the advantages thereof.

What is claimed is:—

A plug comprising a discharge nozzle adapted to be secured in a pipe, said discharge nozzle having a circumferential flange on its lower end, a hinge member secured to the outer face of said flange at the lower edge thereof, a cap secured to said hinge member, said cap having a recess in its upper face, a disk resting in said recess and engaged in the end of said discharge nozzle, said disk having an annular flange, a gasket positioned between the last mentioned flange and the face of the flange of the discharge nozzle to form an air-tight connection between the same, a clamping screw threaded through said cap and engaged with the under face of said disk to clamp the same in the lower end of the discharge nozzle, a hook pivoted to said cap opposite the hinge member and engaged over the flange of the discharge nozzle, and a locking lug mounted upon the upper face of said flange of the discharge nozzle to prevent disengagement of the hook.

In testimony whereof I affix my signature in presence of two witnesses.

MICHAEL BELFRY.

Witnesses:
A. H. GOLDSTEIN,
N. B. SALENK.

Copies of this patent may be obtained for five cents each, by addressing the "Commissioner of Patents, Washington, D. C."